United States Patent [19]
Hurd, III

[11] 3,739,222

[45] June 12, 1973

[54] BAR-GRAPH DISPLAY APPARATUS
[75] Inventor: Edward T. E. Hurd, III, Cinnaminson, N.J.
[73] Assignee: Honeywell Inc., Minneapolis, Minn.
[22] Filed: Aug. 20, 1970
[21] Appl. No.: 65,507

[52] U.S. Cl. .............................. 315/22, 340/324 AD
[51] Int. Cl. ............................................. H01j 29/70
[58] Field of Search .................. 315/22, 18, 26, 25; 340/324 A, 324 AD

[56] References Cited
UNITED STATES PATENTS

| | | | |
|---|---|---|---|
| 3,648,270 | 3/1972 | Metz | 340/324 AD |
| 3,343,030 | 9/1967 | Dragon et al. | 315/22 |
| 3,537,098 | 10/1970 | Nienlsen et al. | 315/22 X |
| 3,103,658 | 9/1963 | Chiang | 315/22 X |
| 3,025,123 | 3/1962 | Klein | 315/22 X |

Primary Examiner—Carl D. Quarforth
Assistant Examiner—J. M. Potenza
Attorney—Arthur H. Swanson, Lockwood D. Burton and Mitchell J. Halista

[57] ABSTRACT

A cathode-ray-tube display produces a plurality of separate bar-graph displays on a viewing face. A plurality of individual input signals are each sequentially compared with an output level from a staircase generator during a single horizontal sweep of the CRT viewing face. A vertical sweep circuit is arranged to move the CRT beam in sequence along a plurality of horizontal levels while a counter means synchronizes the aforesaid comparison operation with a movement of the CRT beam along each horizontal level. Each equality between the compared signals during the comparison operation produces an intensity turn-on control signal for the CRT to effect a display of a horizontal level segment of a corresponding display bar.

12 Claims, 2 Drawing Figures

Patented June 12, 1973

INVENTOR.
EDWARD T. E. HURD
BY Mitchell J. Halista
ATTORNEY.

INVENTOR.
EDWARD T. E. HURD

BAR-GRAPH DISPLAY APPARATUS

BACKGROUND OF THE INVENTION

In current manufacturing, research or any of the numerous scientific and industrial areas using statistical sampling techniques, there is a need for examining a large number of independent variables in a manner which allows the operator to discern individual or group variation of the variables from desired or limit values. For example, the temperatures in a manufacturing process which are individually produced by a large number of thermocouples are concurrently displayed before an operator to determine the extent of the control to be exercised over the process. Similarly, to achieve a correlation of outputs from a plurality of strain gauges attached to a device being load tested the strain guages signals must be simultaneously examined. In order for the data in such applications to be displayed in useful form it must be assembled into a form convenient for concurrent analysis. Further, an accurate presentation of such data is effective to insure a rapid and proper operation of the equipment involved. Conventional prior art practice has usually involved several approaches to assemble such data. One technique has been to manually plot bar-graph charts which show the dispersion of the input data about the established limits. This method is, of course, slow and laborous and is incapable of providing a rapid presentation of the data to provide information to an operator for control of an actual process. The data has, also, been recorded on data processing devices, e.g., magnetic tape, and then assembled and programmed into a digital computer for analysis and plotting by an XY plotter or similar device. Such a sophisticated procedure is time consuming and requires the use of expensive equipment as well as computer time. Other attempts, such as switching a plurality of channels to a common amplifier supplying a display device to allow such channels to be displayed on a time shared basis, have generally resulted in a lack of precision due to the switching action and the signal transients caused by the switching circuits involved.

An object of the present invention is to provide a electronic display apparatus which presents input data in the form of a visible bar-graph.

Another object of the present invention is to provide a bar-graph display apparatus wherein the display of a plurality of input signals is achieved substantially simultaneously.

A further object of the present invention is to provide an electrically operable bar-graph display apparatus which is sensitive to individual input signals to provide corresponding individual display bars of varying extent in response thereto.

A still further object of the present invention is to provide a bar-graph oscilloscopic display apparatus for providing a multiplicity of visual display bars representing respective input signals to enable an operator to individually examine the amplitudes of a plurality of input signals.

In accomplishing these and other objects, there has been provided, in accordance with the present invention, a bar-graph display apparatus having a cathode-ray-tube, i.e., CRT, arranged to have its electron beam driven in a conventional manner with horizontal and vertical sweep signals and including means for controlling the intensity, or brightness, of the sweep at a point on a CRT display face corresponding to the desired location of the bars constituting the bar-graph. The trigger means for the horizontal and vertical sweep signals is, also, used to trigger a staircase generator. The staircase generator, in turn, is effective to produce a staircase signal having predetermined staircase signal levels. Each level of the staircase generator output signal is compared with all of a plurality of input signals to determine if any of the input signal levels are equivalent thereto. The duration of a step in staircase in equivalent to the time taken by a horizontal sweep of the CRT face and a return to a starting side of the CRT face. Concurrently, a counter is arranged to count the pulses of a free-running multi-vibrator triggered by the trigger means for the horizontal and vertical sweeps. The counting operation by the counter produces a sequence of counter output signals which are representative of the number of display bars on the CRT face. A coincidence between the amplitude of a signal level from the staircase generator and an input signal is effective to produce an output signal which, in turn, is combined with a count signal from the counter to control the CRT intensity. A turn-on of the intensity control means of the CRT at the particular location along the horizontal sweep results in a display of a bar segment. This operation is repeated for each of the horizontal sweeps to produce a composite of bar segments.

A BRIEF DESCRIPTION OF THE DRAWINGS

A better understanding of the present invention may be obtained when the following detailed description is read in connection with the accompanying drawings in which.

DESCRIPTION OF THE PREFERRED EMBODIMENT

Figure 1:
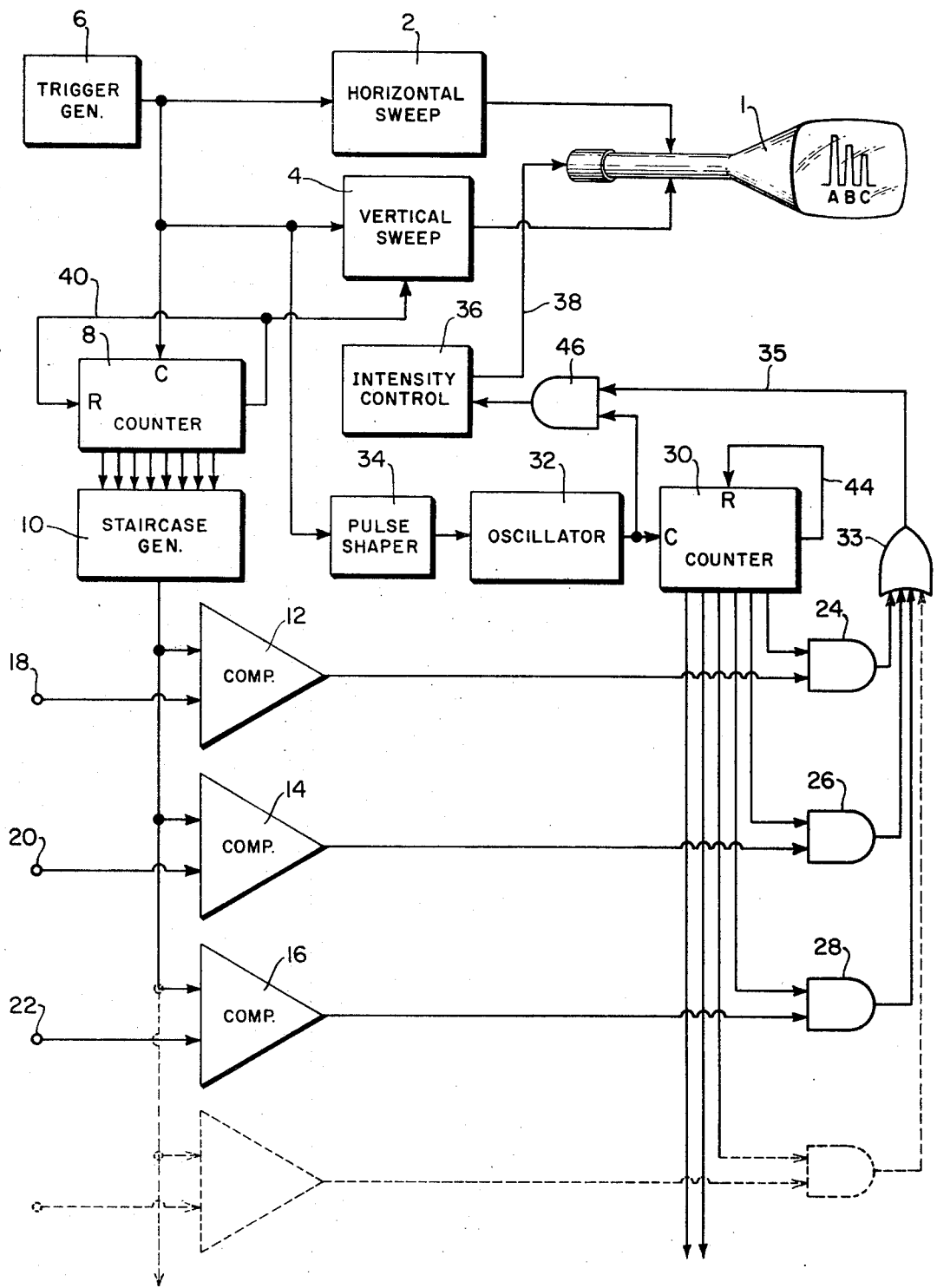
FIG. 1 is a block diagram of a bar-graph display system embodying the present invention.

Referring to FIG. 1 in more detail, there is shown a block diagram of a bar-graph display system embodying the present invention and using a CRT 1 as a display means. The CRT 1 is arranged to have its electron beam driven across a display face thereof by a horizontal sweep generator 2 and a vertical sweep generator 4.

The horizontal sweep means 2 and the vertical sweep means 4 are arranged to control the movement of the CRT electron beam by any suitable conventional technique, e.g., electromagnetic deflection, the details of which do not form a part of the present invention and, hence, are not shown in detail. An output circuit of a trigger generator 6 is connected to the inputs of the horizontal and vertical sweep means 2 and 4 to apply a trigger signal thereto to produce a periodic triggering thereof. The trigger generator 6 may be any suitable conventional device, such as a free-running multivibrator having a suitable frequency of operation. The output circuit of the trigger generator 6 is, also, connected to the input of a counter 8. A plurality of output lines from the counter 8 corresponding to the counter stages are connected to a suitable staircase generator 10. The staircase generator 10 is arranged to convert the count represented by output signals on the output lines from the counter 8 into a corresponding voltage level. A predetermined sequence of count representing output signals from the counter 8, accordingly, is effective to produce a staircase signal from the staircase generator 10 with a sequence of predetermined staircase levels. The output circuit of the staircase generator 10 is connected to a first input of each of a plurality of comparator circuits shown in exemplary form as comparators 12, 14, and 16. The actual number of comparator circuits would be equal to the number of input signals to be displayed on the CRT 1.

A plurality of input terminals shown in exemplary form as input terminals 18, 20, and 22, are arranged to be connected to respective ones of a plurality of input signals sources, e.g., thermocouple circuits. The input signals supplied to the input terminals 18, 20, 22 are applied to second inputs of corresponding ones of the comparators 12, 14, 16 to be compared with the staircase level signal supplied from the staircase generator 10. The output circuits of the comparators 12, 14, 16 are each connected to a first input of a respective one of a plurality of two-input AND gates illustrated as AND gates 24, 26, and 28, e.g., the output circuit of a first comparator 12 is connected to one input of a first AND gate 24.

The other input of each of the AND gates 24 to 26 is connected to a respective one of a plurality of output lines from a second counter 30 corresponding in number to the number of counter stages. The second counter 30 is, in turn, driven by a free-running oscillator 32 having a predetermined frequency of operation, as discussed hereinafter. A trigger signal for periodically synchronizing the operation of the oscillator 32 is obtained from the output circuit of the trigger generator 6 through a pulse shaper 34 connected between the input of oscillator 32 and the output of the generator 6. The output circuits of the AND gates 24 to 28 are connected together to a common output line 35 which is connected to the input circuit of an intensity control means 36. The intensity control means 36 may be any suitable prior art device for turning on and off, i.e., blanking and unblanking, the electron beam of a cathode-ray-tube in response to a input signal applied thereto. The output signal of the intensity control means 34 is applied over a control line 38 to the CRT 1 to control the brightness of a display trace on the display face thereof.

Figure 2:
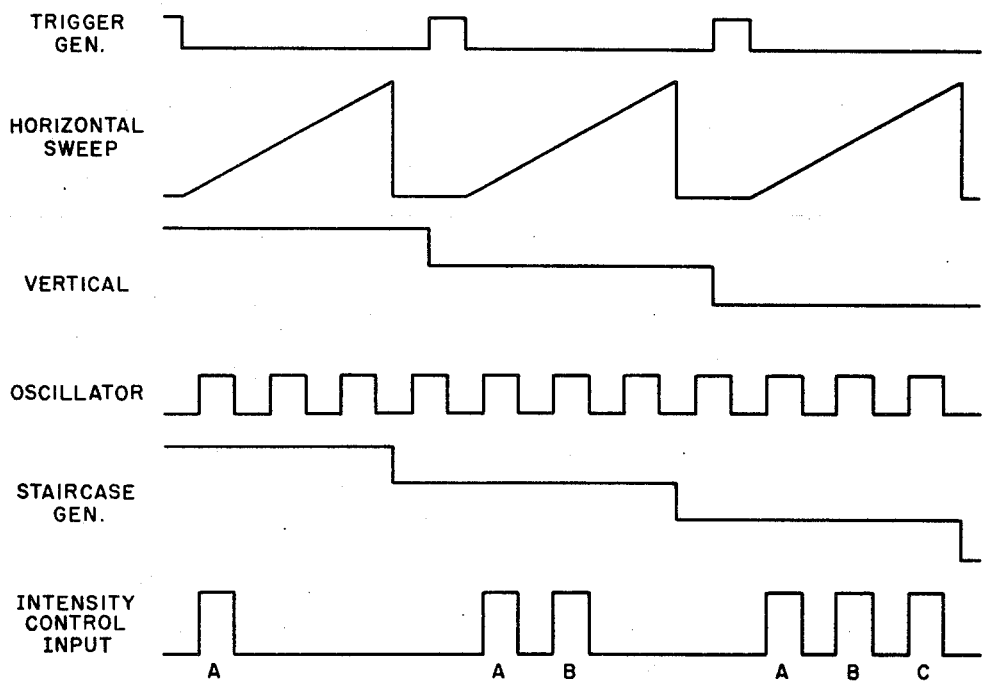
FIG. 2 is a timing diagram illustrating the various wave-shapes found in the system shown in FIG. 1.

In operation, the bar-graph display apparatus of the present invention is effective to produce a bar-graph display on the face of the CRT 1 such as that illustrated in exemplary form in FIG. 1. The three display bars shown on the face of the CRT 1 in FIG. 1 are each representative of a corresponding input variable and are labeled, for purposes of illustration, as bars A, B and C. The following discussion of the apparatus of the present invention is directed to the system shwon in FIG. 1 and to the exemplary wave shapes shown in FIG. 2. The waveshapes shown in FIG. 2 are labeled to correspond to the respective operative blocks of the display system illustrated in FIG. 1.

The output signal from the trigger generator 6 is used to produce a plurality of horizontal sweeps of the electron beam of the CRT 1 by means of the horizontal sweep means 2 and a plurality of vertical steps of the electron beam by means of the vertical sweep means 4. Each of these horizontal sweeps is associated with one of the vertical steps on the display face of the CRT 1 as determined by the combined effect of the output signals from the horizontal sweep means 2 and the vertical sweep means 4. Thus, during each vertical step of the electron beam produced by the vertical sweep means 4, the horizontal sweep means 2 is effective to sweep the beam across the face of the CRT 1. This relationship is shown in the top three waveshapes illustrated in FIG. 2. The number of horizontal sweeps across the display face of the CRT 1 is equal in number to the number of vertical steps. The number of vertical steps, on the other hand, is preset by the desired number of horizontal display segments, or slices, used to form a complete display bar of maximum length.

The output signal of the trigger generator 6 is, also, applied to the first counter 8 whereby a counting operation is performed by the counter 8 of the output signals from the trigger generator 6. The energization of the output lines from the counter 8, accordingly, is a coded representation of the number of trigger signals counted by the counter 8. These counter output lines are, in turn, connected to the staircase generator 10 to produce a corresponding voltage, or staircase, level as shown in the fifth waveshape of FIG. 2. The number of staircase levels is determined by the maximum permissible count by the counter 8 and is equal in number to the desired number of vertical steps of the CRT beam as discussed above.

This staircase level is concurrently applied to the first input circuits of all of the comparator circuits 12, 14, 16 to be compared with the input signals applied to the second input terminals of the comparators 12, 14, 16 from the input terminals 18, 20, 22 respectively. These input signals are arranged to be standardized input signals, i.e., they are arranged to fall within a voltage range which is compatible with the maximum and minimum staircase levels produced by the staircase generator 10. During the occurrence of a coincidence in amplitude level between the staircase level from the staircase generator 10 and the amplitude of an input signal on any of the input terminals 18, 20, 22, an output signal is applied by a comparator detecting such a coincidence to a first input of a respective one of the AND gates 24, 26, 28. For example, assume that a coincidence is detected by the first comparator 12 between the staircase signal level and the amplitude of an input signal applied to the first input terminal 18. This coincidence detection would result in an output signal from the first comparator 12 being applied to the first input of the first AND gate 24.

The other, or second, input signal to the second input of each of the AND gates 24, 26, 28 is obtained from the output circuits of the second counter 30. The input signal to the second counter 30 is obtained from a freerunning oscillator 32 which is periodically triggered into synchronization by the output signal from the trigger generator 6 applied through a pulse shaper 34. Inasmuch as the second inputs of the AND gates 24, 26, 28 are connected to respective ones of the counter stage output lines from the counter 30, the coincidence signal from one of the comparators 12, 14, 16 is ineffective to energize the respective one of the AND gates 24, 26, 28 without the concurrent presence of a signal applied to the second input of that AND gate from the counter 30. The output signals from the counter 30 are taken from the counter stages and correspond in number to the number of bars to be displayed on the CRT display face. Further, the predetermined frequency of the fixed oscillator 32 is arranged to be compatible with the time required for a horizontal sweep of the electron beam along a vertical level on the CRT 1. In other words, the frequency is selected so that the counter 30 produces an output signal on an output line at a time when the electron beam is traversing the location of a bar on the bar-graph display. Accordingly, when a signal is received by an AND gate at a first input from one of the comparator circuits 12, 14, 16 indicative of the presence of an input signal having an amplitude corresponding to a staircase level, the corresponding one of the AND gates 24, 26, 28 will be energized to produce an output signal only when an output signal from the counter 30 is concurrently applied thereto. This summing function is effective to insure that the intensity control 36 is operated only during the time that the electron beam is at the location of a bar on the bar-graph display.

Assume that the waveshapes shown in FIG. 2 are representative of an operation of the disclosed bar-graph display apparatus during a display of the three display bars A, B, C, shown on the face of the CRT 1 in FIG. 1. Specifically, the three display bars A, B, and C are shown as being of differing vertical heights and, accordingly, represent corresponding input signals of three different amplitudes within the standardized input signal range. In this illustration the output signal from the first comparator circuit 12 representative of an input for the first bar A is effective to produce an output signal during a staircase level corresponding to the top of the bar-graph. This staircase level is produced by the staircase generator 10 during the time of a first horizontal sweep by the horizontal sweep means 2 at a first vertical level determined by the vertical sweep means 4 at the top of the bar-graph. The output signals from this comparator circuit is, in turn, applied to the first input of the first one of the AND gates, shown in exemplary form as AND gate 24. The first AND gate 24 is, subsequently, effective to produce a gate output signal upon receipt of a concurrent count signal from the counter 30 indicative of the fact that the first cycle of the output signal from the oscillator 32 has been counted.

This gate output signal is applied to the intensity control 36 to turn-on, i.e., unblank, the electron beam of the CRT 1 to produce a visible trace in the form of a horizontal segment, or slice, defining the width of the first display bar. The width of the first bar is dependent upon the time interval between the aforesaid beam turn-on and the occurrence of the next cycle from the oscillator 32. The first bar segment is terminated when the oscillator 32 produces a second signal to be counted by the counter 30. The change in the count stored by the counter 30 produced by the second signal from the oscillator 32 is effective to remove the signal applied to the second input of the first gate 24. As a result, the output signal from the AND gate 24 is, also, removed from the intensity control 36 to effect a turn-off, i.e., blanking, of the electron beam of the CRT 1. No further energizing signals are applied to the intensity control 36 during the remainder of the first horizontal sweep. In other words, although subsequent output signals from the counter 30 are applied in sequence to the second inputs of the remaining AND gates 26, 28, no output signals from the comparator 14, 16 are concurrently present at the first inputs thereof. Thus, only the first display bar A is displayed at the height corresponding to the first horizontal sweep at the top of the bar-graph since the amplitudes of the remaining input signals are insufficient to produce an output signal from the respective ones of the remaining comparators 14, 16. Accordingly, for each horizontal sweep all of the AND gates 24, 26, 28 are sequentially energized by the sequential output signals from the counter 30 to test whether or not a signal from a respective one of the comparators 12, 14, 16 is being concurrently applied thereto. In the case of a coincidence of the first and second input signals to any of the AND gates 24, 26, 28, an output signal is applied along line 35 to actuate the intensity control 36 to turn-on the electron beam of the CRT 1 during the duration of a horizontal bar slice.

If all of the display bars of the bar-graph display are either of the same height (representing equal amplitude input signals) or are all to be visible on a preselected horizontal level, then each of the comparators 12, 14, 16 would produce an output signal to be applied to the first input of respective ones of the AND gates 24, 26, 28. Each of these AND gates 24, 26, 28 would, in turn, develop an output signal during the occurrence of a concurrent output signal from the counter 30 applied to the second input of the gates 24, 26, 28 in sequence during the counting operation by the counter 30. This situation would result in an illumination, i.e., display, of a slice of each of the display bars on the same horizontal level on the bar-graph display. In other words, the counter 30 would produce sequential output signals representative of counts of the output signals from the oscillator 32. These output signals would be applied in sequence to respective ones of the second inputs of the gates 24, 26, 28. Inasmuch as an input signal on the first input of each of the gates 24, 26, 28 from the comparators 12, 14, 16 would already be present, the gates 24, 16, 28 would each produce an output signal in sequence on line 35 to turn-on the CRT beam by means of the intensity control 36. This sequence of output signals from the gates 24, 26, 28 would occur at the sequence rate of the output signals from the counter 30, and the time of occurrence of each output signal would correspond to the time during which the electron beam of the CRT 1 is at the location of a display bar. Thus, when a vertical location has been reached on the display corresponding to an equality of the staircase level to the amplitudes of each of the input signals, the display system will continue to concurrently display, i.e., illuminate, the remaining portions of each of the display bar from that vertical location to the last vertical level, e.g., bottom of the display.

When the bottom of the display is reached by the sequential operation of the vertical sweep means 4, the counter 8 is arranged to reset itself by a feedback signal applied along line 40 and to concurrently trigger a reset of the vertical sweep means to an initial position, e.g., top of the display face of the CRT 1. The counting operation of the counter 30, on the other hand, is continued during this process inasmuch as the oscillator 32 is continuing to produce an output signal at its predetermined frequency synchronized by each of the signals from the trigger generator 6. The counter 30, however, may be provided with an additional number of counter stages to reflect the time required to reset the horizontal sweep to an initial position at the beginning of a new vertical level and to effect a subsequent reset function by means of a feedback signal applied on a reset line 44. Thus, the counter 30 may be synchronized in this manner to always start supplying count output signals to the first one of the gate 24, 26, 28 connected to a comparator comparing a first input signal when the electron beam is positioned to produce a display at an initial side of the bar-graph display. On the other hand, if it is not desired to coordinate the display in this fashion, the oscillator 32 may be arranged to produce only a number of cycles between trigger pulses corresponding to the number of bars to be displayed. As shown in dotted outline in FIG. 1, the system can be expanded to accommodate additional display bars by increasing the number of comparators and AND gates with a concurrent increase in the count outputs from the counter 30.

A two input AND gate 46 is arranged to sum the output signal on line 35 with the output signals from the oscillator 32 to produce an output signal for energizing the intensity control 36. This output signal from the AND gate 46, is accordingly only present when both of its input signals are present, i.e., during the time of an output signal from the oscillator 32 and an output signal from the OR gate 33. Accordingly, the output signal from the AND gate 46 is used to energize the intensity control 36 to produce the display bars with the width of each bar corresponding to the duration of an output signal from the oscillator 32, i.e., the spaces between the bars correspond to the spaces between the oscillator output signal. If a run-on display is desired, the gate 46 may be eliminated and the signals on line 35 applied directly to the intensity control 36.

Thus, it may be seen that there has been provided in accordance with the present invention, a bar-graph display apparatus using a CRT for producing individual bar-graph display bars corresponding to individual input signals to effect a simultaneous display of the amplitudes of the input signals.

The embodiments of the invention in which an exclusive property or privilege is claimed are defined as follows:

1. A display system for concurrently displaying the amplitudes of a plurality of input signals comprising
   a display means having a display face,
   means for producing a display on said display face,
   means for selectively controlling said means for producing a display to produce said display at selected locations,
   means for moving said means for producing a display along selected ones of a plurality of predetermined paths on said display face,
   means for selectively selecting ones of said predetermined paths,
   trigger signal means arranged to operate said means for moving and means for selectively selecting in a predetermined cyclic fashion,
   staircase generator means responsive to said trigger signal means to generate a sequence of predetermined signal levels, each of said signal levels having a duration equal to the time of a movement of said means for producing a display along one of said predetermined paths,
   means for concurrently comparing each of said signal levels with all of the input signals to produce an output signal on respective ones of a plurality of output lines,
   a plurality of logic summing gates each having one input connected to a respective one of said output lines,
   an oscillator means,
   synchronizing means connecting said oscillator means to said trigger signal means to effect a synchronization of the occurrence of output signals from said oscillator means with display locations along each one of said predetermined paths,
   counter means arranged to count said output signals from said oscillator means, said counter means having a plurality of output circuits, each of said output circuits carrying a separate count output signal, means connecting each of said output circuits to respective ones of a second input of said plurality of logic gates and
   means for applying in common all of the output signals from said logic gates to said means for selectively controlling to effect a selective energization of said means for producing a display.

2. A display system as set forth in claim 1 wherein said display means is a cathode-ray-tube, said means for producing a display is an electron beam arranged to write on the display face of said tube and said means for selectively controlling said electron beam is an intensity control means capable of selectively blanking and unblanking said electron beam.

3. A display system as set forth in claim 2 wherein said means for moving is a horizontal sweep means and said means for selectively selecting is a vertical sweep means.

4. A display system as set forth in claim 5 wherein said staircase generator means includes a second counter means for counting output signals from said trigger means and staircase generator means for converting responsive to a count signal from said second counter means for producing a staircase level.

5. A display system as set forth in claim 4 wherein said second counter means is reset at the end of a vertical sweep of said display face by said vertical sweep means.

6. A display system as set forth in claim 5 wherein said first-mentioned counter means has a maximum count corresponding to the number of output signals from said oscillator means during a movement of said electron beam by a horizontal sweep produced by said horizontal sweep means.

7. A display system as set forth in claim 6 wherein said second counter means has a maximum count corresponding to the number of staircase levels to be produced by said staircase generator means.

8. A display system as set forth in claim 1 wherein said plurality of logic summing gates are each two-input AND gates.

9. A display system for concurrently displaying the amplitudes of a plurality of input signals comprising;
   a display means having a display face,
   means for producing a display on said display face;
   means for selectively controlling said means for producing a display to produce said display at selected locations;
   means for moving said means for producing a display along selected ones of a plurality of predetermined paths on said display face;
   means for selectively selecting ones of said predetermined paths;
   trigger signal means arranged to operate said means for moving and means for selectively selecting in a predetermined cyclic fashion;
   staircase generator means responsive to said trigger signal means to generate a sequence of predetermined signal levels, each of said signal levels having a duration equal to the time of movement of said means for producing a display along one of said predetermined paths;

means for concurrently comparing each of said signal levels with all of the input signals to produce an output signal representative of a detected equality between any of said input signals and each of said signal levels; and synchronizing means responsive to output signals from said means for concurrently comparing to said means for selectively controlling to effect a selective energization of said means for producing a display at said predetermined display locations along each one of said predetermined paths.

10. A display system as set forth in claim 9 wherein said display means is a cathode-ray-tube, said means for producing a display is an electron beam arranged to write on the display face of said tube and said means for selectively controlling said electron beam is an intensity control means capable of selectively blanking and unblanking said electron beam, said means for moving is a horizontal sweep means and said means for selectively selecting is a vertical sweep means.

11. A display system for displaying the amplitude of an input signal comprising, a display means having a display face;

means for producing a display on said display face;

means for selectively controlling said means for producing a display to produce said display at selected locations;

means for moving said means for producing a display along selected ones of a plurality of predetermined paths on said display face;

means for selectively selecting ones of said predetermined paths;

trigger signal means arranged to operate said means for moving and means for selectively selecting in a predetermined cyclic fashion;

staircase generator means responsive to said trigger signal means to generate a sequence of predetermined signal levels, each of said signal levels having a duration equal to the time of movement of said means for producing a display along one of said predetermined paths;

means for concurrently comparing each of said signal levels with the input signal to produce an output signal representative of a detected equality between said input signal and each of said signal levels; and synchronizing means responsive to output signals from said trigger signal means to apply said output signal from said means for concurrently comparing to said means for selectively controlling to effect a selective energization of said means for producing a display at said predetermined display locations along each one of said predetermined paths.

12. A display system as set forth in claim 11 wherein said display means is a cathode-ray-tube, said means for producing a display is an electron beam arranged to write on the display face of said tube and said means for selectively controlling said electron beam is an intensity control means capable of selectively blanking and unblanking said electron beam, said means for moving is a horizontal sweep means and said means for selectively selecting is a vertical sweep means.

* * * * *